US008781733B2

(12) United States Patent
Staehlin et al.

(10) Patent No.: US 8,781,733 B2
(45) Date of Patent: Jul. 15, 2014

(54) VEHICLE SYSTEM FOR NAVIGATION AND/OR DRIVER ASSISTANCE

(71) Applicant: Continental Teves AG & Co. oHG, Frankfurt (DE)

(72) Inventors: Ulrich Staehlin, Eschborn (DE); Thomas Grotendorst, Eschborn (DE); Robert Gee, Lake Barrington, IL (US)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 13/887,493

(22) Filed: May 6, 2013

(65) Prior Publication Data

US 2013/0245941 A1 Sep. 19, 2013

Related U.S. Application Data

(62) Division of application No. 12/867,606, filed as application No. PCT/EP2009/051678 on Feb. 13, 2009.

(30) Foreign Application Priority Data

Feb. 15, 2008 (DE) ......................... 10 2008 009 463
Feb. 15, 2008 (DE) ......................... 10 2008 009 464
Feb. 22, 2008 (DE) ......................... 10 2008 010 666
Oct. 15, 2008 (DE) ......................... 10 2008 051 776

(51) Int. Cl.
*G01C 21/00* (2006.01)

(52) U.S. Cl.
USPC .......................................................... 701/450

(58) Field of Classification Search
None
See application file for complete search history.

(56) References Cited

U.S. PATENT DOCUMENTS

2005/0058155 A1* 3/2005 Mikuriya et al. ............. 370/474
2005/0251334 A1* 11/2005 Mizuno ......................... 701/209
2008/0147305 A1* 6/2008 Kawamata et al. ........... 701/117
2009/0287412 A1 11/2009 Menzel et al.
2009/0306886 A1 12/2009 Mueller
2010/0228470 A1* 9/2010 Sakakibara .................. 701/200

FOREIGN PATENT DOCUMENTS

DE 102 33 376 2/2004
DE 10 2004 005152 8/2005
DE 10 2004 010197 9/2005
DE 10 2008 018 163 10/2008
EP 1 111 336 6/2001
EP 1 522 824 4/2005
EP 1 775 552 4/2007
WO WO 2007/063127 6/2007
WO WO 2007/065725 6/2007
WO WO 2008/000820 1/2008

OTHER PUBLICATIONS

International Search Report for PCT/EP2009/051678 issued Oct. 10, 2009.
German Search Report for DE 10 2009 008 959.4 dated Nov. 17, 2009.

(Continued)

*Primary Examiner* — Thomas Tarcza
*Assistant Examiner* — Adam Alharbi
(74) *Attorney, Agent, or Firm* — RatnerPrestia

(57) ABSTRACT

Disclosed herein is assistance, safety and navigation technology for vehicles. In particular, the disclosure relates to a vehicle system and a method for controlling the vehicle system.

3 Claims, 6 Drawing Sheets

(56) References Cited

OTHER PUBLICATIONS

C. Ress, et al., "Electronic horizon—supporting ADAS applications with predictive map data", 13th World Congress Exhibition on Intelligent Transport Systems and Services, Oct. 2006, pp. 1-8. XP002546070.

W. Vogt, et al., "Navigation-Based Driver Assistance Systems", ITS European Congress, Jun. 2005, pp. 1-11. XP002546106.

* cited by examiner

VEHICLE SYSTEM FOR NAVIGATION AND/OR DRIVER ASSISTANCE

CROSS REFERENCE TO RELATED APPLICATIONS

This application is a divisional of application Ser. No. 12/867,606, filed Nov. 4, 2010, which is the U.S. National Phase Application of PCT International Application No. PCT/EP2009/051678, filed Feb. 13, 2009, which claims priority to German Patent Application No. DE 10 2008 009 463.3, filed Feb. 15, 2008; German Patent Application No. 10 2008 009 464.1, filed Feb. 15, 2008; German Patent Application No. 10 2008 010 666.6, filed Feb. 22, 2008; and German Patent Application No. 10 2008 051 776.3 filed Oct. 15, 2008, the contents of such applications being incorporated herein by reference.

FIELD OF THE INVENTION

The invention relates to assistance, safety and navigation technology for vehicles. In particular, the invention relates to a vehicle system and a method for controlling the vehicle system.

BACKGROUND OF THE INVENTION

Driver assistance systems to assist the driver in driving a vehicle and navigation systems to guide a driver or a vehicle from a starting point to a desired destination are already in existence. The course of the road, signs, etc. in the vehicle's surroundings can be transmitted to driver assistance systems by means of an ADAS horizon (ADAS=Advanced Driver Assistance System) which is produced by navigation systems. In this way, the driver or the driver assistance system can react early to dangers or traffic situations ahead.

SUMMARY OF THE INVENTION

It is an object of the invention to improve or extend the functions of the aforesaid vehicle systems.

This object is achieved by means of a vehicle system or a method for the control thereof. According to an exemplary embodiment of the invention, a vehicle system is provided which comprises a positioning module for determining a current vehicle position on the basis of the output of a satellite signal sensor and at least one surroundings sensor, vehicle sensor and/or transport telematics receiver; an ADAS horizon provider which provides an ADAS horizon for driver assistance; a provider unit which includes the positioning module and the ADAS horizon provider, wherein the provider unit can be coupled to communicate with a navigation unit and wherein the ADAS horizon provider is designed to provide the ADAS horizon at a rate exceeding that of the output of the satellite signal sensor. The ADAS horizon can thus be provided independently of the update rate of the relevant sensors (e.g. by means of a Kalman filter) and the updates of the ADAS horizon can therefore be provided at update rates which are not triggered by a sensor. Satellite and vehicle sensor signals are fused with surroundings sensor data in the provider unit, thus enabling the accuracy of the ADAS horizon to be increased. During this fusion, traffic lane information of a surroundings camera can be used, for example, to obtain a more accurate position of the vehicle on the road, thus improving the accuracy, reliability, quality and up-to-date status of the ADAS horizon and ensuring safer provision of the ADAS horizon.

The words "at least one surroundings sensor, vehicle sensor and/or transport telematics receiver" in the present description mean that at least one element from the group consisting of a surroundings sensor, a vehicle sensor and a transport telematics receiver is provided. The preferred element from the aforesaid group is, in this context, the surroundings sensor or the surroundings sensors.

According to another exemplary embodiment, a vehicle system is provided which furthermore comprises a navigation unit in which a digital map can be stored. This increases accuracy even further since a digital map is available in addition to the sensors.

According to another exemplary embodiment, a vehicle system is configured to include a dynamics module which detects dynamic data and updates relating to variables influencing the ADAS horizon. This also increases the accuracy of the output of the vehicle system, ensuring that conditions which are subject to daily change, such as traffic congestions, roadwork sites, etc., are taken into account when producing the ADAS horizon.

According to another exemplary embodiment of the invention, a vehicle system is provided whose navigation unit and provider unit are designed such that a map extract from the digital map showing the current surroundings of the vehicle can be transmitted by the navigation unit to the provider unit. Thanks to this map extract which is present in the provider unit, a map extract showing the surroundings of the vehicle is available to the provider unit even if the navigation unit fails. Since a vehicle is often moved on the same routes, for example when driving to work each day, exactly this map portion may be available to the provider unit. In addition, the map portion can be processed more easily and quickly in terms of computing and storage, thus improving the performance of the provider unit.

According to another exemplary embodiment of the invention, a vehicle system is provided whose navigation unit and provider unit are designed such that a map extract from a digital map showing the current surroundings of the vehicle can be transmitted by the navigation unit to the provider unit, on the basis of the vehicle position which is determined by the positioning module. Position determination is considerably more precise due to the fact that the navigation unit receives the vehicle position from the provider unit since vehicle and surroundings sensors can be taken into account when determining the position, which would otherwise not be available to the navigation unit.

According to another exemplary embodiment of the invention, a vehicle system is provided whose provider unit matches the map extract with the current vehicle position which has been determined by the positioning module.

According to another exemplary embodiment of the invention, a vehicle system is provided whose provider unit can be coupled to communicate with a navigation unit which is located outside the vehicle. Such a connection to a navigation unit located outside the vehicle enables sensors and devices within the vehicle to be omitted, and large amounts of data are available since a server located outside the vehicle can be designed to be very powerful.

According to another exemplary embodiment of the invention, a vehicle system is provided which further comprises an automatic emergency call unit which is included in the provider unit. In this way, the time until help arrives in case of a breakdown or an accident can be reduced and it can be ensured that the relevant services are informed at all.

According to another exemplary embodiment of the invention, a vehicle system is provided whose provider unit is designed to make the current vehicle position which has been determined by the positioning module available for transmission to the navigation unit. If the navigation unit receives the vehicle position from the provider unit, position determination is considerably more precise since vehicle and surroundings sensors can be taken into account when determining the position, which would otherwise not be available to the navigation unit.

According to another exemplary embodiment of the invention, a vehicle system is provided whose navigation unit is a mobile navigation unit which is not fixedly connected to the vehicle. Mobile navigation devices have the advantage that they can also be used outside the vehicle: for hiking, in private planes and boats. In addition, such navigation devices can be exchanged quickly and without problems in case of technical innovations. If such a mobile navigation device is used in the vehicle, the aforesaid advantages can be combined with the advantages of more precise position determination described earlier herein.

According to another exemplary embodiment of the invention, a vehicle system is provided whose mobile communication unit is designed for wireless communication with the provider unit. This avoids loosening and wear of plug-in connections and is user-friendly.

According to another exemplary embodiment of the invention, a vehicle system is provided whose navigation unit and provider unit are designed such that parts of the map extract can be transmitted in an order of priority. In this way, in case of failure of the navigation unit, the probability that the important map parts have already been transmitted when the navigation unit fails can be increased, thus increasing the safety of the vehicle system.

Advantageously, the order of priority depends on a distance of the part of the map extract from the current vehicle position, so that closer parts can be transmitted first.

In addition or as an alternative, the order of priority may depend on a probability of a further course of travel, so that parts of the map extract which are more likely to be travelled can be transmitted first.

According to another exemplary embodiment of the invention, a vehicle system is provided whose navigation unit comprises an additional provider unit comprising an ADAS horizon provider of its own which provides an ADAS horizon for driver assistance. This has the advantage that the information available is redundant.

According to another exemplary embodiment of the invention, a vehicle system is provided whose navigation unit is designed to communicate with an ADAS horizon provider which is located externally of the vehicle and the navigation unit and provides an ADAS horizon for driver assistance. This connection to an ADAS horizon provider located outside the vehicle enables sensors and devices within the vehicle to be omitted, and large amounts of data are available since a server located outside the vehicle can be designed to be very powerful.

According to another exemplary embodiment of the invention, a vehicle system is provided whose digital map can be authenticated using cryptographic methods.

According to another exemplary embodiment of the invention, a vehicle system is provided whose digital map cannot be used by the vehicle system until a check phase has been completed during which the digital map can be authenticated for a certain period of time by means of a comparison with surroundings and/or vehicle sensors. This ensures that no incorrect or obsolete map material is used.

According to another exemplary embodiment of the invention, a vehicle system is provided in which several navigation units can be coupled to the provider unit and the provider unit is designed to compare the output of the navigation units. This redundancy increases the safety of the vehicle system.

The same advantage is achieved by the exemplary embodiment in which one navigation unit is fixedly connected to the vehicle and another one is a mobile navigation unit.

According to another exemplary embodiment of the invention, a vehicle system is provided which comprises an update module by means of which map updates can be loaded and stored separately from the existing map. In this way, several digital maps are available as a basis for comparison with the output of the surroundings and/or vehicle sensors.

According to another exemplary embodiment of the invention, the vehicle system is designed to compare the existing map and the map update with the output of the vehicle and/or surroundings sensors, checking them for plausibility, and uses the map which coincides more with the output of the vehicle and/or surroundings sensors. This exemplary embodiment has the advantage that the verification of the map updates enables a complex advance quality assurance process to be shortened or even be completely omitted. As a result, map updates can be loaded more quickly and delays due to quality assurance required beforehand can be dramatically reduced without reducing the quality of the map or the applications relying thereon.

According to another exemplary embodiment of the invention, a vehicle system is provided which is designed such that the existing map extract can be overwritten with the updated map extract from the update module if the updated map extract coincides more with the output of the vehicle and/or surroundings sensors. This ensures that the existing map is not overwritten with undue haste and would thus no longer be available.

According to another exemplary embodiment of the invention, a vehicle system is provided whose ADAS horizon provider produces the ADAS horizon on the basis of traffic and/or town signs and/or traffic lane information. In this way, the vehicle or, more precisely, the provider unit can provide the ADAS horizon in a stand-alone manner.

According to another exemplary embodiment of the invention, a vehicle system is provided which further comprises an ADAS horizon reconstruction module designed to receive data from the ADAS horizon provider, which ADAS horizon reconstruction module comprises a further interface by means of which it can receive output of at least one element from the group consisting of a surroundings sensor, a vehicle sensor, a traffic reporting sensor or a telematics sensor and incorporate it in the reconstruction of the ADAS horizon. If additional information is used within the ADAS horizon reconstruction module, dynamic data can be taken into account which is not taken into account or cannot be taken into account by the ADAS horizon provider which is often included in the separate navigation system. Since the data is already incorporated in the ADAS horizon reconstruction module, the ADAS application need not be changed any more, so that this dynamic data is available to all systems which are connected downstream of the ADAS horizon reconstruction module.

According to another exemplary embodiment of the invention, a vehicle system is provided which comprises at least one surroundings sensor, vehicle sensor and/or traffic telematics receiver; and an ADAS horizon provider which produces an ADAS horizon for driver assistance, relying, at least temporarily, exclusively on the surroundings sensor, the vehicle sensor and/or the traffic telematics receiver. In this way, the vehicle can produce an ADAS horizon without navigation signals from a navigation satellite, thus being able to produce an ADAS horizon and transmit it to a driver assistance system in an independent manner even during a dead time, failure or absence of a navigation device. This exemplary embodiment can be combined with the other exemplary embodiments described in the present summary in order to achieve the advantages which are mentioned in the relevant passages.

According to another exemplary embodiment of the invention, a vehicle system is provided which comprises a positioning module for determining a current vehicle position; an ADAS horizon provider which provides an ADAS horizon for driver assistance, and a provider unit which includes the positioning module and the ADAS horizon provider, wherein the provider unit can be coupled to communicate with a mobile navigation unit which not fixedly connected to the vehicle. Mobile navigation devices have the advantage that they can also be used outside the vehicle: for hiking, in private planes and boats. In addition, such navigation devices can be exchanged quickly and without problems in case of technical innovations. If such a mobile navigation device is used in the vehicle, these advantages can be combined with the advantages of more precise position determination described earlier herein. This exemplary embodiment can be combined with the other exemplary embodiments described in the present summary in order to achieve the advantages which are mentioned in the relevant passages.

According to another exemplary embodiment of the invention, a vehicle system is provided which comprises an update module by means of which a map update can be loaded; a version memory in which the map update can be stored separately from an existing map; at least one vehicle sensor, surroundings sensor and/or traffic telematics receiver; and a map update provider designed to compare the map update with the output of the vehicle sensor, surroundings sensor and/or traffic telematics receiver and check it for plausibility. This exemplary embodiment has the advantage that the verification of the map updates enables a complex advance quality assurance process to be shortened or even be completely omitted. As a result, map updates can be loaded more quickly and delays due to quality assurance required beforehand can be dramatically reduced without reducing the quality of the map or the applications relying thereon. This exemplary embodiment can be combined with the other exemplary embodiments described in the present summary in order to achieve the advantages which are mentioned in the relevant passages.

According to another exemplary embodiment of the invention, a vehicle system is provided which comprises an ADAS horizon provider which provides an ADAS horizon for driver assistance, and an ADAS horizon reconstruction module designed to receive data from the ADAS horizon provider, wherein said ADAS horizon reconstruction module comprises a further interface by means of which it can receive output of at least one element from the group consisting of a surroundings sensor, a vehicle sensor, a traffic reporting sensor or a telematics sensor, and modifies the ADAS horizon on the basis of this output. If additional information is used within the ADAS horizon reconstruction module, dynamic data can be taken into account which is not taken into account or cannot be taken into account by the ADAS horizon provider which is often included in the separate navigation system. Since the data is already incorporated in the ADAS horizon reconstruction module, the ADAS application need not be changed any more, so that this dynamic data is available to all systems which are connected downstream of the ADAS horizon reconstruction module. This exemplary embodiment can be combined with the other exemplary embodiments described in the present summary in order to achieve the advantages which are mentioned in the relevant passages.

According to another exemplary embodiment of the invention, a vehicle system is provided which comprises a provider unit comprising an ADAS horizon provider which provides an ADAS horizon for driver assistance; at least one vehicle sensor, surroundings sensor and/or traffic telematics receiver; wherein the provider unit can be coupled to communicate with a navigation unit to receive an ADAS horizon and wherein the ADAS horizon provider is adapted to use the output of the vehicle sensor, surroundings sensor and/or traffic telematics receiver as a basis to modify the ADAS horizon which can be received by the provider unit. This has the advantage that the provider unit included in the vehicle provides an ADAS horizon by means of the ADAS horizon provider of its own in each case. If this vehicle system is coupled to a (mobile) navigation system which can also provide an ADAS horizon of its own, this connection to the provider unit improves the ADAS horizon of the navigation unit thanks to the downstream ADAS horizon provider of the provider unit, specifically to the incorporation of the surroundings and/or vehicle sensors and/or the traffic telematics receiver which is/are mounted in the vehicle.

According to another exemplary embodiment, a method for controlling a vehicle system is provided which comprises the steps of: determining a current vehicle position on the basis of the output of a satellite signal sensor and at least one vehicle sensor, surroundings sensor and/or traffic telematics receiver, and providing an ADAS horizon by means of an ADAS horizon provider for driver assistance, wherein the ADAS horizon is provided at a rate exceeding that of the output of the satellite signal sensor.

According to another exemplary embodiment, a method for controlling a vehicle system is provided in which an ADAS horizon is produced relying, at least temporarily, exclusively on a vehicle sensor, the surroundings sensor and/or the traffic telematics receiver.

According to another exemplary embodiment, a method for controlling a vehicle system for map verification is provided which comprises the steps of: loading a map update in an update module; storing the map update in a version memory separately from an existing map, and comparing the map update with the output of at least one vehicle sensor, surroundings sensor and/or traffic telematics receiver and checking it for plausibility.

According to another exemplary embodiment, a method for controlling a vehicle system is provided which comprises the steps of: providing an ADAS horizon for driver assistance, and loading the output of at least one element from the group consisting of a surroundings sensor, a vehicle sensor, a traffic reporting sensor or a telematics sensor in an ADAS horizon reconstruction module designed to receive data from the ADAS horizon provider, and modifying the ADAS horizon on the basis of the information loaded in the ADAS horizon reconstruction module.

If the above exemplary embodiments relating to methods are used, the advantages menin connection with the relevant devices can also be achieved by means of these methods.

According to another exemplary embodiment of the invention, a program element is provided which instructs a processor to carry out the steps mentioned above if it is executed on the processor of a vehicle system.

According to another exemplary embodiment of the invention, a computer-readable medium is provided on which a program element is stored which instructs a processor to carry out the steps mentioned above if it is executed on a processor.

Exemplary embodiments of the invention will now be described with reference to the figures.

DETAILED DESCRIPTION OF THE INVENTION

Figure 1:
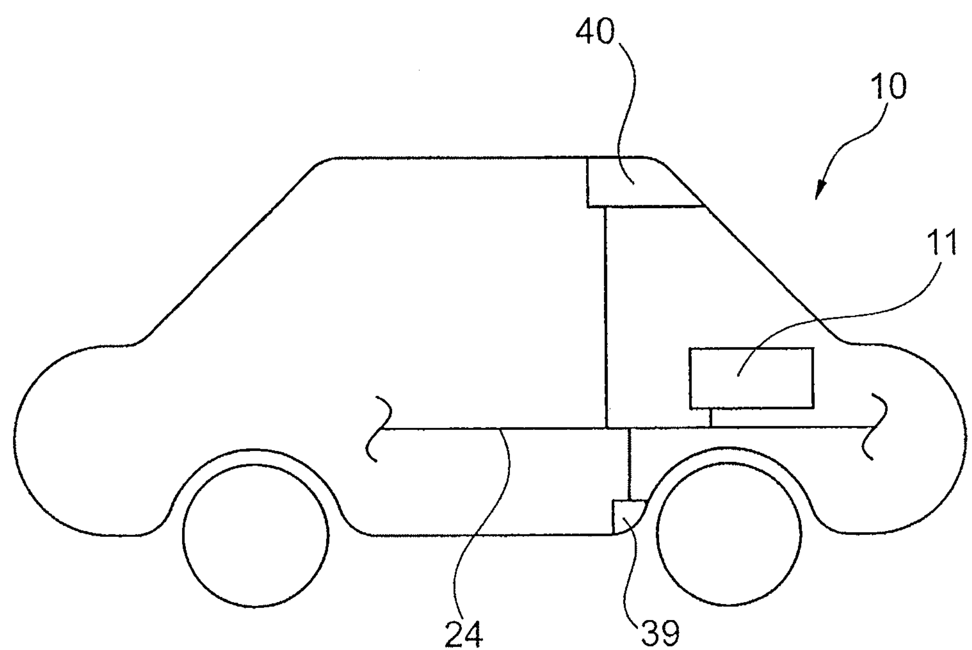
FIG. 1 shows a vehicle which is equipped with the vehicle system according to aspects of the invention.

FIG. 1 shows a vehicle 10 which is equipped with the vehicle system 11 (or 111, 211) according to aspects of the invention.

Figure 2:
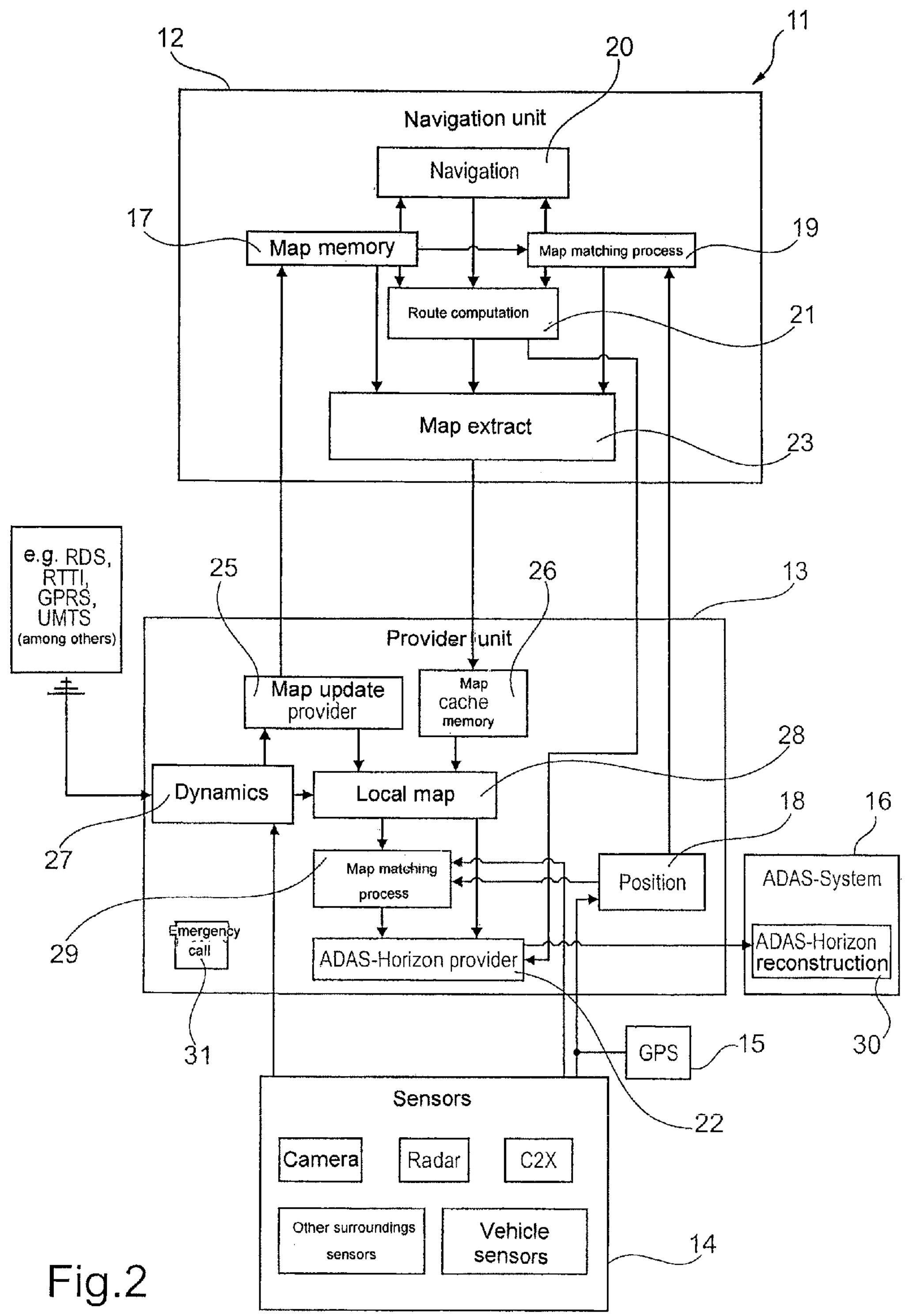
FIG. 2 shows a first exemplary embodiment of the vehicle system according to aspects of the invention.

FIG. 2 shows a first exemplary embodiment of the vehicle system 11 according to aspects of the invention. The vehicle system 11 comprises a navigation unit 12, a provider unit 13, sensors 14, a satellite signal sensor 15, and a driver assistance system 16 (ADAS=Advanced Driver Assistance System).

The navigation unit 12 includes a map memory 17 in which a (complete) digital map or road map is stored. Updates of the digital map or of map extracts thereof are also stored in this map memory 17. The navigation unit 12 receives a current vehicle position from a positioning module 18 of the provider unit 13. As an alternative or in addition, the navigation unit 12 may comprise a satellite signal sensor of its own which serves to receive signals of the GPS, Galileo, GLONASS, Compass or IRNSS navigation satellite systems. The position determined by the positioning module 18 is transmitted to a map matching module of the navigation unit 12. Here, the position from the positioning module 18 is used for map matching, i.e. the digital map which is stored in the map memory 17 is matched with the current vehicle position. To compensate for measuring inaccuracies, the measured position can be matched to the map information relating to the position and geometry of objects in the map in the map matching module 19, so that, for example, the current vehicle position which has been determined is corrected to be on and not beside a road. Furthermore, the navigation unit 12 includes a navigation module 20 and a route computing module 21 both of which can access the digital map in the map memory 17 as well as the map matching function of the map matching module 19. In the navigation module 20, a route to a desired destination is determined and displayed in a map. The route is determined by a route computing module 21. The two modules 20 and 21 provide navigation for a driver, i.e. their functions are those usually associated with navigation systems. The navigation module 21 serves as an interface to the driver (e.g. output such as "turn left after 200 m" or "please turn around). The route computing module 21 determines the route to the desired destination according to instructions entered by the driver (e.g. fastest route, shortest route, etc.). The route determined in this way is supplied to an ADAS horizon provider 22 of the provider unit 13. The map matching result of the map matching module 19, the route determined by the route computing module 21 and the digital map of the map memory 17 are used as a basis by a map extract module 23 to supply an extract from the map showing the current surroundings of the vehicle 10 to the provider unit 13. This map extract is supplied to the ADAS horizon provider 22 within the provider unit 13. The navigation unit 12 is an independent device which is connected to the provider unit 13 by means of a fast connection. This connection can also be used by the map memory 17 to receive the updates for the digital map from the provider unit 13. Thanks to this connection to the provider unit 13 and the associated transmission of map updates as well as the current vehicle position, the navigation unit 12 need not be connected to a vehicle bus 24 (see FIG. 1); instead, the provider unit 13 is connected to the vehicle bus 24 in order to receive data from vehicle sensors 39, surroundings sensors 40, traffic telematics receivers, etc. which are also connected to the vehicle bus 24.

The provider unit 13 includes a map update provider 25, a map cache memory 26, a dynamics module 27, a local map memory 28, a map matching module 29, and, as already mentioned, the positioning module 18 and the ADAS horizon provider 22. The dynamics module 27 detects all dynamic data and updates relating to the digital map and/or the ADAS horizon, such as e.g. traffic congestion data, new road courses, data from telematics services (e.g. C2X=Car-to-X Communication, but also RDS/TMC, etc.), in particular traffic telematics services. The dynamics module 27 receives this data by means of transmission systems such as, for example, the Radio Data System (RDS), the Real Time Traffic Information system (RTTI), the General Package-oriented Radio Service (GPRS) or UMTS (Universal Mobile Telecommunications System), DSRC (Dedicated Short Range Communication) according to IEEE802.11p, etc. This dynamic data is directly supplied to the map update provider 25 and the local map module 28 and is thus available to the other units too. The map update provider 25 checks the dynamic data for authenticity and changes the relevant map extracts which are stored in the map memory 17 or the local map module 28 or overwrites the relevant map extracts available so far with the map extracts which have been newly loaded. In addition, it serves for the intermediate storage of updates for the digital map, regardless of whether updates are to be made in the navigation unit 12 or not. The map cache memory 26 receives a map extract from the map extract module 23 and forwards it to the local map module 28 where this map extract can be adapted according to the dynamic data, if required. The local map module 28 forwards the digital map relating to the surroundings of the vehicle 10 to the ADAS horizon provider 22. In addition, the relevant map extract is subjected to matching in the map matching module 29 which is arranged between the local map module 28 and the ADAS horizon provider 22. The map matching module 29 adapts the local map on the basis of data supplied by the sensors 14 and the positioning module 18. The map matching process carried out by the map matching module 29 is separate from the map matching process carried out in the navigation unit 12 and is limited to the map extract which has been supplied. In addition, the dynamic information is taken into account here.

The positioning module 18 relies on the sensors 14 and the satellite signal sensor 15 to determine the current vehicle position, and forwards it to the map matching modules 19 and 29. The satellite signal sensor 15 can be integrated in the provider unit 13 or be arranged separately and connected to the provider unit 13 for data exchange. The satellite signal sensor 15 can, for example, receive signals of the GPS, Galileo, GLONASS, Compass or IRNSS navigation satellite systems. The sensors 14 comprise vehicle sensors, surroundings sensors or traffic telematics receivers for receiving traffic telematics services (C2X) which supply position and surroundings information, preferably by means of vehicle-tovehicle communication or vehicle-to-infrastructure communication. The term "vehicle sensor" used in this description comprises sensors such as, for example, travel distance sensors, speed sensors, steering wheel angle sensors, wheel rotational speed sensors 39, yaw rate sensors, etc., i.e. the vehicle sensors are sensors which detect a state of the vehicle or vehicle parts; in particular, the vehicle sensors detect a state of motion of the vehicle. The surroundings sensors are sensors such as, for example, cameras 40, a radar, LiDAR sensors or ultrasonic sensors, etc., i.e. surroundings sensors are sensors which detect the surroundings of the vehicle, wherein the surroundings sensors are mounted on the vehicle and detect objects in the vehicle's surroundings in a stand-alone-manner, i.e. without information signals from outside. The traffic telematics receivers mentioned here preferably communicate via an automotive WLAN according to the IEEE 802.11p standard, by means of vehicle-to-vehicle communication, vehicle-to-infrastructure communication, RDS, TMC, RTTI, GPRS, UMTS or DSRC. This communication relates to position information, surroundings information relevant to the vehicle (e.g. object information, traffic lane or route information, traffic flow information), route information or traffic flow information (the two latter also outside the vehicle's surroundings). In this way, for example, the information which is detected by the surroundings sensor of a vehicle travelling in front can be transmitted to following vehicles by means of vehicle-to-vehicle communication. In general and in addition to the position information, the sensors 14 also supply information (e.g. object information or route information such as traffic lane information) which can be used for map matching purposes; the sensors 14 are therefore directly coupled to the map matching module 29 too. The map matching process has, however, less priority than position determination by the positioning module 18.

The ADAS horizon provider 22 receives a map extract from the navigation unit 12 or, more precisely, the map extract module 23, via the local map module 28 and the map matching module 29. This map extract covers the current surroundings of the vehicle 10 during a specified period of time of, for example, T seconds or longer. In addition, the route computing module 21 transmits the currently selected route to the ADAS horizon provider 22. The aforesaid map extract, the current route and the position received from the positioning module 18 (via the map matching module 29) are the basis to produce an ADAS horizon. The ADAS horizon is a horizon of expectations relating to the further course of roads and traffic and on the basis of which a driver assistance system assists a driver in driving. The provider unit 12 or, more precisely, the ADAS horizon provider 22 can provide updates of the ADAS horizon at a rate exceeding the output rate of the satellite signal sensor 15 (GPS rate) since model-based or model-assisted position determination is used in the positioning module 18 which uses the output of several of the different sensors 14 and 15 to compute the current vehicle position. This computation can be done independently from the update rate of the relevant sensors (e.g. by means of a Kalman filter) and the updates of the ADAS horizon can therefore be provided at update rates which are not triggered by a sensor 14, 15. If satellite and vehicle sensor signals are fused with surroundings sensor data and traffic telematics information in the provider unit 13, the accuracy of the ADAS horizon can be increased. During said fusion, traffic lane information received from a surroundings camera can be used, for example, to obtain a more accurate position of the vehicle on the road, thus improving the accuracy, reliability, quality and up-to-date status of the ADAS horizon and ensuring safer provision of the ADAS horizon.

Furthermore, during the map matching process in the map matching module 29, a surroundings camera can, for example, detect that there are only two traffic lanes available (e.g. due to an accident) although there should be three traffic lanes according to the map material. This information can be directly used as an input parameter for producing the ADAS horizon. In addition, a sign detection feature may serve to identify the type of a traffic sign or even to read the name of a place/town/city on signposts/town signs, thus enabling the map matching module 29 to match the signs included in the map with those which are present in reality. Also, information provided by a radar can be used to estimate the further course of the traffic lane and match this information with the map information. This approach ensures that the ADAS horizon reflects the currently valid road situation instead of the road situation at a time when the map data was recorded.

The ADAS horizon provided by the ADAS horizon provider 22 is transmitted to the driver assistance system 16 which includes an ADAS horizon reconstruction module 30 which uses the ADAS horizon which is preferably transmitted to the driver assistance system 16 in compressed form to reconstruct the ADAS horizon. The ADAS horizon reconstruction module 30 acts as a link between the ADAS horizon provider 22 and the ADAS applications. The provider unit 13 which has been described thus comprises communication units (see dynamics module 27) for communication with the outside world (Wifi, GSM/UMTS/ . . . , C2X, etc.) or interfaces to one or more communication units, the satellite signal sensor 15 or interfaces to said sensor, a connection to the vehicle bus 24, the positioning module 18 and the ADAS horizon provider 22, ideally within one unit. Furthermore, the provider unit 13 also includes an eCall module 31 which automatically alarms emergency services in case of an emergency. Since an automated emergency call (eCall) requires position determination, it is advantageous if the positioning module 18 and the eCall module are included in the same unit.

The division of this exemplary embodiment in the navigation unit 12 and the provider unit 13 having the functionalities described above ensures that the driver assistance system 16 (or other vehicle systems or ADAS applications) receive an ADAS horizon even if the navigation unit 12 (or an infotainment unit with an integrated navigation unit) is not available or fails for a short while. Thanks to the aforesaid division, the navigation unit 12 can be designed using lower safety standards and can thus be equipped with new functions more quickly, which is important in terms of infotainment. This focus on functionality is called "feature-driven". In contrast, the provider unit 13 is designed to meet higher safety standards, which is necessary for driver assistance systems; this focus is called "safety-driven". The aforesaid division therefore reduces the probability that the ADAS horizon will not be available, compared to a solution which is exclusively based on a navigation unit, since the provider unit 12 can be designed according to higher safety standards. Another advantage of this division is that the data rate can be kept more constant in this way since the provider unit 13 is designed according to higher safety standards and does not comprise a user interface, thus eliminating a source of disturbance for computation (reaction to user input). The transfer of the sensor fusion feature to the provider unit 13 as a central place ensures that all vehicle systems receive the same ADAS horizon and that said horizon is always the best one possible.

In the exemplary embodiment described above, the navigation unit 12, the provider unit 13, the sensors 14, the satellite signal sensor 15 and the driver assistance system 16 are integrated in the vehicle 10. It is, however, also possible that the navigation unit 12 be arranged outside the vehicle 10 and the provider unit 13 communicates wirelessly with the navigation unit 12; the navigation unit 12 is then transferred to a server outside the vehicle, for example. In this way, it is also possible to produce the ADAS horizon on the basis of off-board navigation only.

According to a modification of this first exemplary embodiment, an additional fusion unit may be provided which is located outside the provider unit and carries out a comprehensive sensor fusion which can be corroborated by the map data. According to this modification, the ADAS horizon provider can also be transferred to the fusion unit. The other modules which are included in the provider unit 13 continue to be located in the provider unit 13 in this modification.

Figure 3:
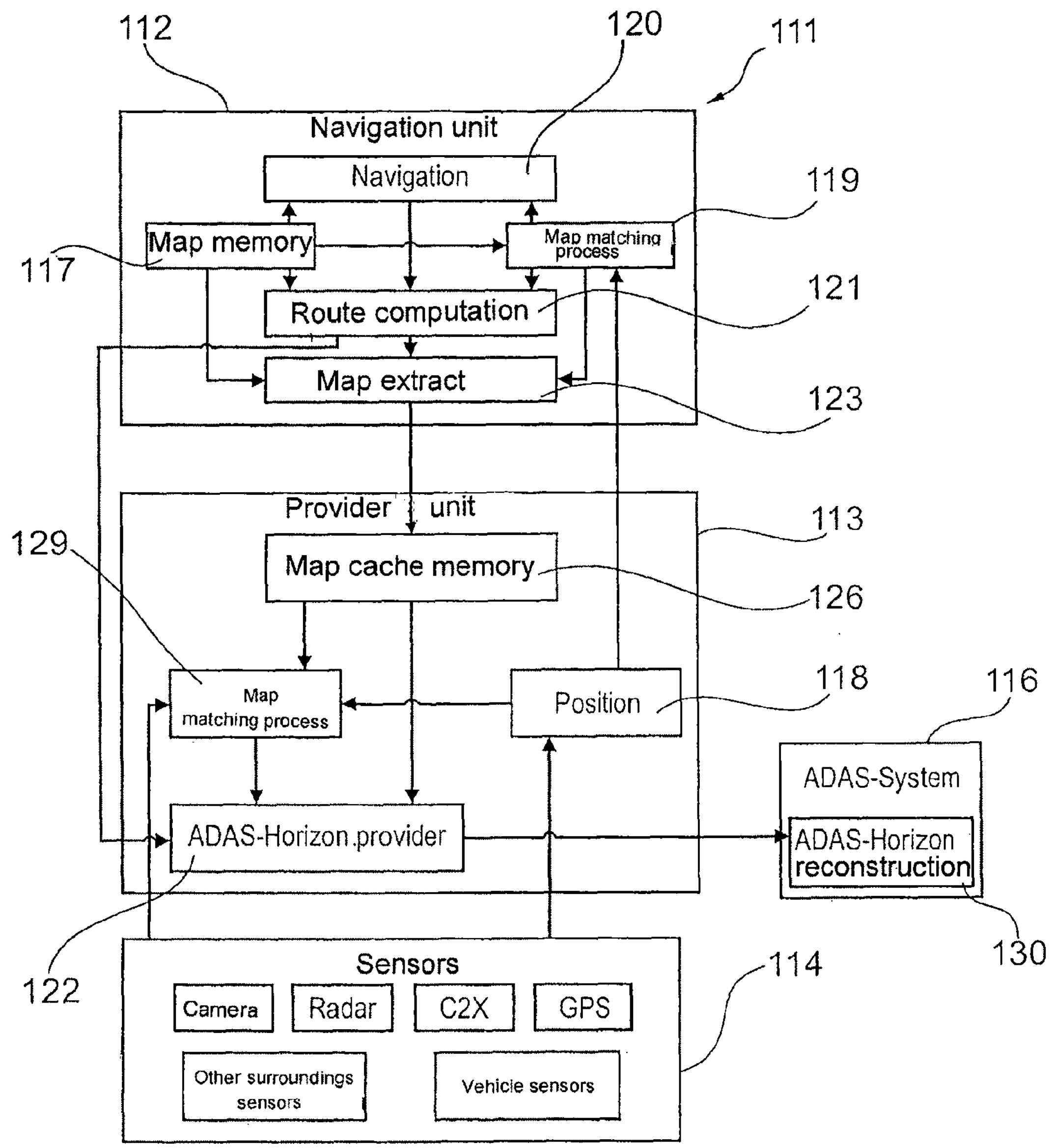
FIG. 3 shows a second exemplary embodiment of the vehicle system according to aspects of the invention.

FIG. 3 shows a second exemplary embodiment of the vehicle system 111 according to aspects of the invention. The use of digital maps or map data in an existing driver assistance system requires a (navigation) module which is integrated in the vehicle. Many drivers, however, use a mobile navigation device since these devices cost less, can be exchanged easily and can thus be improved during the vehicle's service life.

This is the start point of the present exemplary embodiment. The first exemplary embodiment has already proposed an architecture which temporarily stores a map extract and/or uses sensors to ensure that driver assistance systems still receive map information if the navigation unit fails or does not react for a short while. The present exemplary embodiment now expands this basic idea to include a connection to mobile units.

The vehicle system 111 comprises a mobile navigation unit 112, a provider unit 113, sensors 114 and a driver assistance system 116 (ADAS=Advanced Driver Assistance System).

The navigation unit 112 includes a map memory 117 in which a digital map or road map is stored. The navigation unit 112 receives a current vehicle position from a positioning module 118 of the provider unit 113. In addition, the navigation unit 112 may comprise a satellite signal sensor of its own by means of which, for example, signals of the GPS, Galileo, GLONASS, Compass or IRNSS navigation satellite systems can be received. The position determined by the positioning module 118 is transmitted to a map matching module 119 of the navigation unit 112 which carries out a map matching process, as does the map matching module 19. Furthermore, the navigation unit 112 includes a navigation module 120 and a route computing module 121, which correspond to the description of the respective modules 12, 20 and 21 of the first exemplary embodiment. The route produced by the route computing module 121 is supplied to an ADAS horizon provider 122 of the provider unit 112. The provider unit 113 is supplied by a map extract module 123 with an extract from the map showing the current surroundings of the vehicle. This map extract is supplied to the ADAS horizon provider 122 within the provider unit 113. The navigation unit 112 is an independent, mobile device (or another mobile device including digital maps or a navigation function) and is connected to the provider unit 113 (or the vehicle) by means of wireless (e.g. Bluetooth, WLAN) or wired (e.g. USB) communication technology. Instead of a mobile navigation device, a smartphone including a suitable navigation function or navigation software or similar systems can also be used for the mobile navigation unit 112.

The provider unit 113 comprises a map cache memory 126, a map matching module 129, and, as already mentioned, the positioning module 118 and the ADAS horizon provider 122. The provider unit 113 is connected to the vehicle bus 24 in order to receive data from the sensors 114, such as, for example, vehicle sensors 39, surroundings sensors 40, traffic telematics receivers, etc. The provider unit 113 is preferably located in the vehicle 10 and is not a part of the mobile navigation device. The map cache memory 126 receives a map extract from the map extract module 123. The map cache memory 126 forwards the digital map relating to the vehicle's surroundings to the ADAS horizon provider 122. In addition, the map matching module 129, which is arranged between the map matching module 129 and the ADAS horizon provider 122, subjects said map extract to a matching process. The map matching module 129 modifies the local map using data received from the sensors 114 and the positioning module 118. The map matching process carried out in the map matching module 129 is separate from the map matching process carried out in the navigation unit 112 and is limited to the map extract which has been supplied. The map extract can be transmitted from the map extract module 123 to the provider unit 113 or, more precisely, the map cache memory 126, in such a manner that information relating to the immediate surroundings of the vehicle 10 is transmitted first, followed by information relating to the wider surroundings. Analogously, those parts of the map which are likely to be travelled (e.g. main roads) are transmitted first, followed by the parts which are less likely, etc. The map extract is selected such that it covers the current surroundings of the vehicle 10 for a period of time of T seconds or longer. This ensures that, even in case of failure of the connection or of the navigation unit 112, map data will be available long enough to send a warning to the driver, if required, and to adapt the functionality of the provider unit 113 and the driver assistance system 116 during a transition time in such a manner that a map is no longer needed.

The positioning module 118 relies on the sensors 114 to determine the current vehicle position, and forwards it to the map matching modules 119 and 129. The sensors 114 comprise vehicle sensors (such as, for example, travel distance sensors, speed sensors, steering wheel angle sensors, wheel rotational speed sensors, yaw rate sensors, etc.), surroundings sensors (such as, for example, cameras, a radar, etc.) or traffic telematics receivers (C2X). Furthermore, the sensors 114 comprise a satellite signal sensor which serves, for example, to receive signals of the GPS, Galileo, GLONASS, Compass or IRNSS navigation satellite systems. As an alternative, the satellite signal sensor can also be integrated in the provider unit 113. In addition to the position information, the sensors 114 also supply information (e.g. object information) which can be used for map matching purposes; the sensors 114 are therefore directly coupled to the map matching module 129 too.

The ADAS horizon provider 122 receives a map extract from the navigation unit 112 or, more precisely, the map extract module 123 via the map cache memory 126 and the map matching module 129. This information is used to produce an ADAS horizon, as described in the first embodiment, which is made available to the driver assistance system 116. In other words, a map matching process is carried out in the provider unit 113 on the basis of the map extract, the position supplied by the positioning module 118 and the route (if any) supplied by the route computing module 121, and an ADAS horizon is produced on the basis of said process.

This division has the advantages which have already been described in connection with the first embodiment and will not be repeated here.

If the mobile navigation unit 112 or the mobile navigation device is connected to the provider unit 113 as described above, the position signals determined by the positioning module 118 are also transmitted by the provider unit 113 (i.e. from the vehicle) to the mobile navigation unit 112. These position signals enable the mobile navigation device to provide a better navigation than would be possible without said connection to the provider unit 113 (or the vehicle 10) since the positioning module 118 does not use satellite signals only, as is common with navigation devices, but in addition relies on the vehicle and surroundings sensors mentioned above for position determination. If the mobile navigation device 112 has access to additional position information sources which are not available in the vehicle 10 (e.g. via communication links), this information can be used to improve the position which has been determined, for example during the map matching process in the map matching module 119.

All blocks or modules of the provider unit 113 need not be physically realized in the same control device. Analogously, the sensors 114 can be realized separately from each other. It is also possible that an additional provider unit be located in the mobile navigation device 112 and transmits an additional ADAS horizon to the vehicle 10 (see sixth exemplary embodiment). As a result, there is a further redundancy for the computation of the ADAS horizon, and transmission errors (e.g. of the map extract or the ADAS horizon) can be detected if the ADAS horizon does not match the map extract.

If a navigation device is installed in the vehicle 10 in addition to the navigation unit 112 described above, the information supplied by the installed navigation device might be complemented by data from the mobile navigation unit 112 in case this information is not available in the installed device. In addition, a comparison of the map extracts supplied by the installed navigation device and the mobile navigation unit 112 can be made in this way, thus detecting errors in the map material. This redundancy of the information leads to increased safety, compared to just one map source.

Furthermore, the mobile navigation device 112 might not compute the ADAS horizon itself, but send the position to a server for computation of the ADAS horizon which is then transmitted to the mobile navigation device 112 which, in turn, forwards it to the vehicle 10.

To ensure that the map data is safe and reliable, they are authenticated using cryptographic methods. For this purpose, a vehicle manufacturer may, for example, specify a code which must be used to encode and/or certify the data to make the vehicle 10 or the provider unit 113 accept it. If the map data is not authenticated, the data can nevertheless be used in certain circumstances provided they have been confirmed by the (surroundings) sensor data for a pre-defined period of time. This ensures that the mobile navigation devices conform to a certain quality standard since they will otherwise not receive a code from the vehicle manufacturer.

If two or more different mobile navigation devices are connected (e.g. a PNA (Portable Navigation Assistant)/mobile navigation system) and a mobile phone having a navigation function, the information or position and navigation output of these devices can be compared. In this way, the reliability of the information can be better assessed and availability can be improved.

According to a modification of the second exemplary embodiment, the navigation unit 112 is a server which is located outside the vehicle 10 and assumes the function of the navigation unit 112 described above. This is a so-called off-board navigation where data is received from the server via an air interface. Such an off-board navigation can be used instead of a mobile navigation device or both system types can be mixed or used in parallel.

The second exemplary embodiment can be combined with the methods for use of dynamic data and map updates described in connection with the first exemplary embodiment.

This second exemplary embodiment enables mobile navigation devices or other mobile devices including digital maps and/or navigation capabilities to be used as the basis for an ADAS horizon for driver assistance systems. The cryptographic verification of the map data ensures that the map data conforms to a certain quality standard and only verified map data can be used.

A third exemplary embodiment will now be described, which is a further development of the previous exemplary embodiments, in particular of the first exemplary embodiment.

Figure 4:
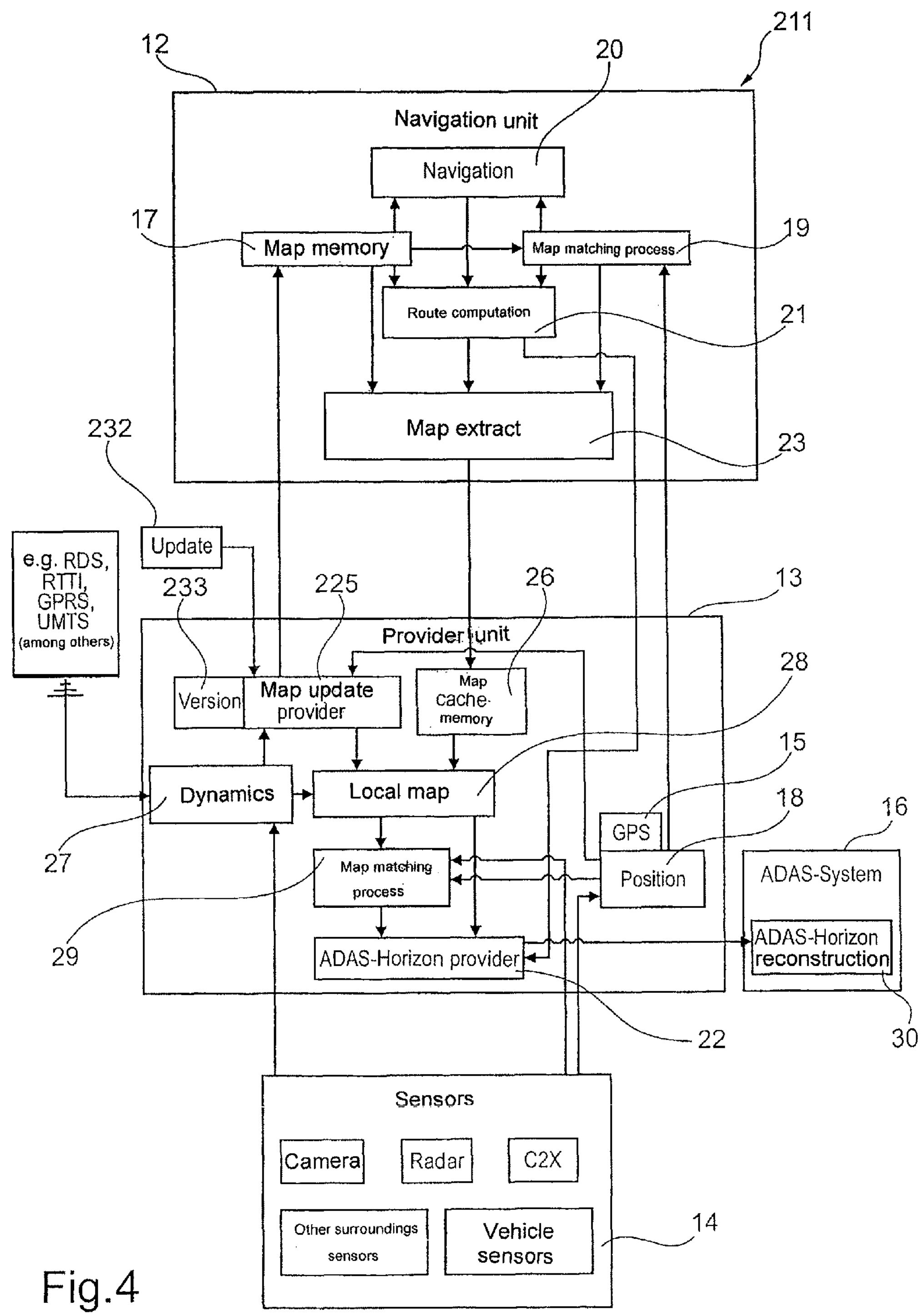
FIG. 4 shows a third exemplary embodiment of the vehicle system according to aspects of the invention.

FIG. 4 shows a third exemplary embodiment of the vehicle system according to aspects of the invention.

Only those elements are described with reference to FIG. 4 which are not included in FIG. 2. All other aspects are identical to the description relating to FIG. 2.

If an update is loaded in a map update provider 225 via an update module 232 for a digital map according to this exemplary embodiment, this update is stored in a version manager 233 of the map update provider 225 in parallel to the existing map, so that one or more update versions are accessible in the version memory 233 in addition to the existing map in the map memory 17 or the map cache memory 26. If the vehicle 10 is moved in an area which is concerned by one or more of the updates stored in the version memory 233, one or all of the updates which are relevant to this area is/are compared to the output of the sensors 14, preferably the surroundings sensors, and it is checked whether the attributes are correct, i.e. whether the output of the sensors 14 coincides with the updates. In this way, video sensors can be used to verify traffic signs, for example. The course of the road can be verified using the map matching function implemented in the map update provider 225. This map matching process can be carried out using the current vehicle position determined by the positioning module 18, in addition to the sensors 14. In addition to the updates, the existing map in the map cache memory 26 as well as the update can be checked for plausibility. If the result of the map matching process is that the current traffic situation or the current course of the road coincides more with a road of the existing map, this map is used. This means the new map extract which is selected from among several available map extracts from the map cache memory 26 and the relevant updates is that one which coincides most with the output of the sensors 14 and/or the positioning module 18. Once this check has been made, the map is used which matches reality more closely in each case. This map is also marked as “up to date” and used as standard. The other versions of the map extract are not deleted, however, until the “up-to-date” version of the map extract has been confirmed a larger number of times.

If the vehicle is to be navigated through an area in which map updates have not yet been confirmed, there is a user option to select which map is to be used, i.e. whether the newest version should always be used or a verified version should always be used or whether all versions are to be used and a route is selected which leads to the desired destination in all cases.

The map updates which have been subjected to the quality assurance process described above are correspondingly marked and provided with a status and/or time stamp which indicates when the map data was verified. According to this embodiment, these map updates can be used as up to date versions immediately, and all older version, i.e. prior to the time stamp, be deleted.

This exemplary embodiment has the advantage that the verification of the map updates enables a complex advance quality assurance process to be shortened or even be completely omitted. As a result, map updates can be loaded more quickly and delays due to quality assurance required beforehand can be dramatically reduced without reducing the quality of the map or the applications relying thereon.

A fourth exemplary embodiment will now be described which can be combined, as a whole or in part, with the exemplary embodiments described above.

In connection with the first embodiment, a detailed description has been made of the fusion of sensor data, in particular the fusion of navigation satellite signals with vehicle and/or surroundings sensors and traffic telematics receivers, which enables the quality and accuracy of position determination to be increased and a dead time of a navigation device or a navigation satellite signal sensor to be bridged.

With the approach described in this exemplary embodiment, the vehicle system can even produce the ADAS horizon without any navigation device and map basis at all. In this case, this exemplary embodiment is described with reference to FIG. 2.

In this exemplary embodiment, the map matching module 29 is designed in such a manner that it can supply the necessary input parameters to the ADAS horizon provider 22 even if no digital map is available. This means if there is a digital map, as described in the first exemplary embodiment, the method described below can be used to corroborate the map data or achieve a redundancy for this data, for example to detect and be able to correct errors. This fusion leads to better availability and quality of the ADAS horizon and to a redundancy for the ADAS horizon on the basis of digital maps, thus increasing availability and safety since the fusion of both sources enables an improved ADAS horizon to be achieved, as has already been explained above in connection with the first exemplary embodiment.

This fourth exemplary embodiment goes a step further, still supplying an ADAS horizon even if no digital map and/or navigation satellite signal is/are available, either temporarily or permanently. In this case, the map matching module 29 is designed to supply the input parameters required to produce the ADAS horizon using the sensors 14, in particular the surroundings sensors, as the only basis.

For this purpose, this exemplary embodiment enables a representation of the surroundings to be obtained by means of surroundings sensors. Video sensors can identify the traffic lane and traffic signs, radar or LiDAR or ultrasonic sensors supply data relating to vehicles or general objects in the surroundings, etc. This data can be used to make a prediction relating to the lane (or the road).

In addition, vehicle sensors such as, for example, a steering wheel angle sensor, wheel rotational speed sensor, yaw rate sensor, etc. can be used to corroborate, interpolate or extrapolate, by means of a vehicle model, the information supplied by the surroundings sensors 14. This data detected by the sensors 14 are then used as input parameters to produce an ADAS horizon on the basis of this data. This ADAS horizon can be used to replace a map-based ADAS horizon if no digital map is available in the vehicle 10.

The ADAS horizon which is produced in this manner can also be supplied to the navigation unit 12 or the navigation module 20 if the current surroundings are not included in the map data of the navigation unit 12. This surroundings-sensor-based data can thus also be used as the basis for navigation or suppress erroneous navigation information.

Figure 5:
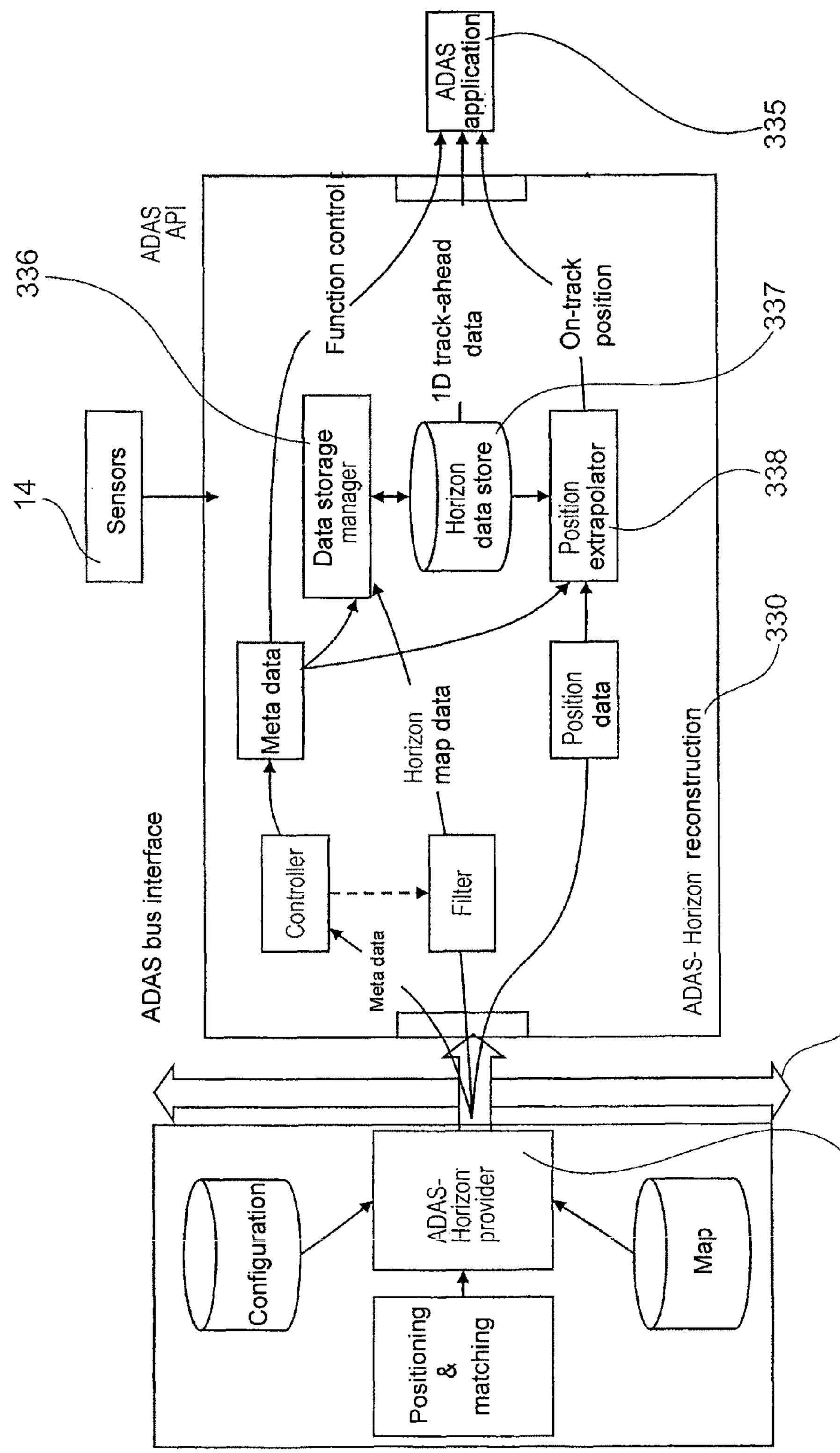
FIG. 5 shows a fifth exemplary embodiment of the vehicle system according to aspects of the invention.

FIG. 5 shows a fifth exemplary embodiment of the vehicle system according to aspects of the invention. This exemplary embodiment can be combined with the exemplary embodiments described above.

As described above, digital maps are converted to an ADAS horizon in order to use said maps in the driver assistance system. The ADAS horizon provider 322 transmits a virtual ADAS horizon to connected devices by means of a sequential update via a CAN bus 334 or another vehicle bus; in said devices, the ADAS horizon reconstruction module 330 combines said updates to form a virtual horizon, as shown in FIG. 5.

All information relating to the characteristics of the virtual horizon or ADAS horizon must be available in the ADAS horizon provider 322 with this approach. Additional information which is not available to said provider cannot be added until the ADAS application 335 level is reached.

According to this fifth exemplary embodiment, existing additional information which is useful for the virtual horizon is integrated in the virtual horizon in the ADAS horizon reconstruction module 330 and made available via the ADAS application program interface (API, Application Program Interface) or the ADAS horizon reconstruction module 330. Said integration preferably takes place in the area of a data store manager 336, a horizon data store 337 and a position extrapolator 338. In these places, additional information for adaptation or modification of the ADAS horizon can be taken into account. The modules of the data store manager 336, the horizon data store 337 and the position extrapolator 338 correspond to the current system definition of the ADASIS forum. If this system information is changed or another system structure is used, integration takes place in other suitable places of the ADAS horizon reconstruction module.

For example, a surroundings sensor can detect the additional objects which are present on the road as well as the distance of said objects from the vehicle and their speed. In the current ADASIS architecture, this information is preferably integrated in the data store manager 336.

In addition, a sensor can detect surroundings information relating to the road condition. For example, an electronic braking system can detect a low friction value during a braking process. Wetness can be detected by means of a rain sensor or a windscreen wiper which has been activated. A potentially icy road surface can be deduced from the combination of a temperature about the freezing point and passing of a bridge, etc.

Furthermore, information relating to traffic congestions, blocked roads, etc. can be obtained using a traffic message channel (TMC) or real time traffic information (RTTI) and taken into account in the area of the data store manager 336 when processing the ADAS horizon.

Moreover, a telematics service can be used to obtain additional information relating to the traffic flow and additional information relating to some or all points of information (POI), which can then be taken into account in the area of the data store manager 336 during modification of the ADAS horizon.

As an alternative, the output of the surroundings sensors is used to assess the traffic flow. In this connection, it is possible, for example, to use radar to deduce that there is a traffic queue from the fact that the distance between the vehicles is small while, at the same time, the travelling speed is low. Furthermore, the traffic flow detected by the surroundings sensors can be used to predict the suitable speed of the driver's own vehicle 10.

If additional information is used within the ADAS horizon reconstruction module 330, dynamic data can be taken into account which is not or cannot be taken into account by the ADAS horizon provider 322 which is often included in the separate navigation system. Since the data is already incorporated in the ADAS horizon reconstruction module 330, no change has to be made in the ADAS application 335, so that this dynamic data will be available to all systems which are connected downstream of the ADAS horizon reconstruction module.

Figure 6:
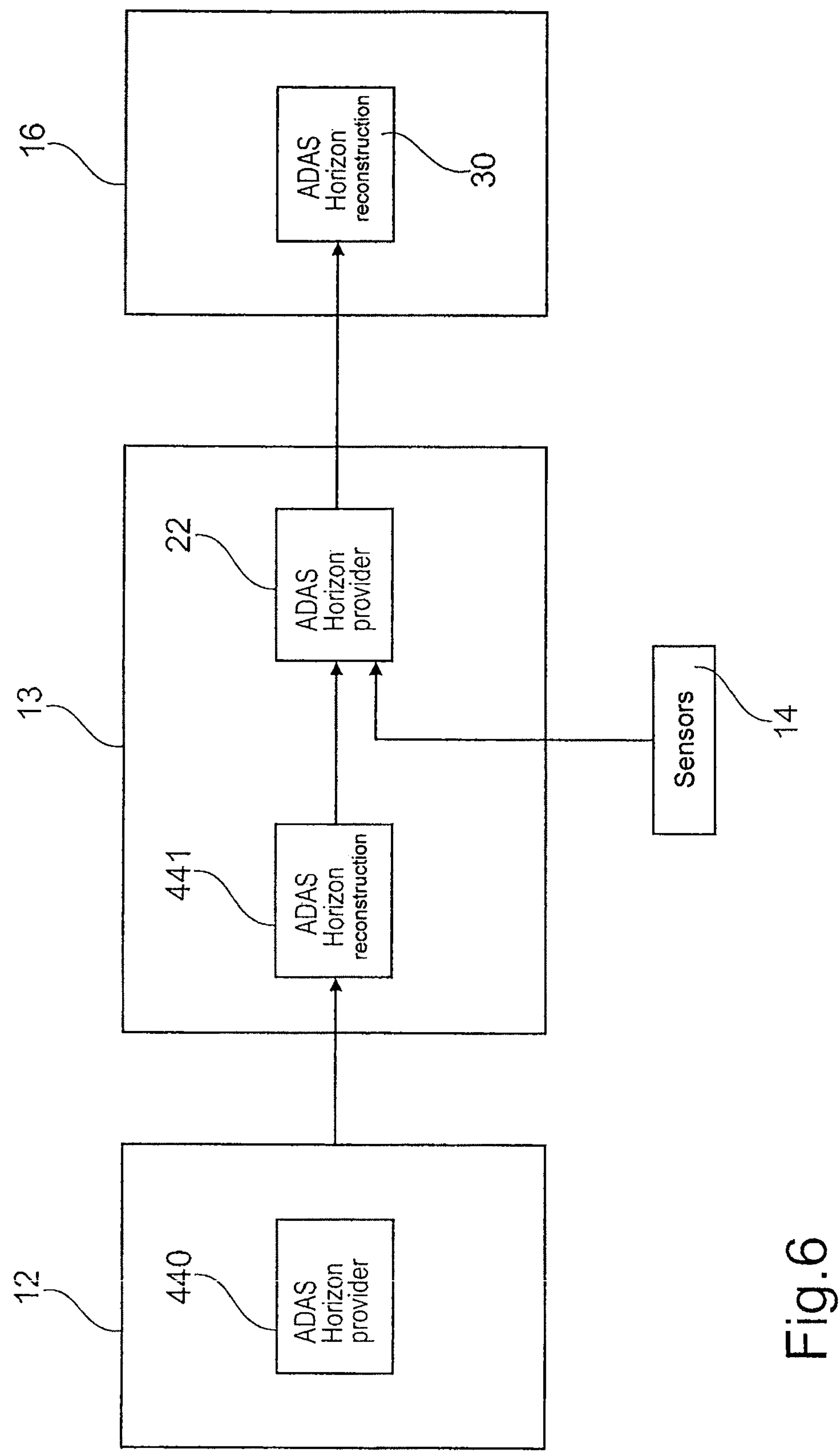
FIG. 6 shows a sixth exemplary embodiment of the vehicle system according to aspects of the invention.

FIG. 6 shows a sixth exemplary embodiment of the vehicle system according to aspects of the invention. This exemplary embodiment can be combined with the preceding exemplary embodiments. To avoid repetitions, only those aspects differing from the preceding exemplary embodiments will be described.

In this exemplary embodiment, the navigation unit 12 is provided with an additional ADAS horizon provider 440 of its own which provides an ADAS horizon on the basis of the map data stored in the navigation unit 12 and the current vehicle position supplied by the navigation unit 12. The navigation unit 12 forwards this ADAS horizon to the provider unit 13. The provider unit 13 includes an ADAS horizon reconstruction module 441 which receives the ADAS horizon from the ADAS horizon provider 440, processes (e.g. decompresses) it as required, and forwards it to the ADAS horizon provider 22 which is included in the provider unit 13. Moreover, the ADAS horizon provider separately receives the output of the sensors 14 and possibly also of the satellite signal receiver 15. If the navigation unit 12 supplies an ADAS horizon, this ADAS horizon is modified, i.e. improved, on the basis of the output of the sensors 14, 15 and is subsequently output to the ADAS horizon reconstruction module 30 of the driver assistance system 16. The other elements of the preceding exemplary embodiments are not shown in FIG. 6 and not mentioned here for reasons of clarity, but it is explicitly stated that these elements may be provided in the suitable places and only those elements which are provided in addition thereto are described in this exemplary embodiment, i.e. that, for example, the map cache memory 26, the local map module 28, the map matching module 29 and the map update provider 25, etc. can be included between the ADAS horizon provider 440 and the ADAS horizon provider 22, in addition to the ADAS horizon reconstruction module.

It is explicitly stated that features which have been described with reference to one of the above exemplary embodiments or the above further developments can also be combined with features of other exemplary embodiments or further developments described above.

The applicant expressly reserves the right to use the features defined in the device claims as the basis for method features formulated in an analogous manner.

What is claimed:

1. A vehicle system located in a vehicle for map verification comprising:

an update module located in the vehicle by which a map update can be loaded;

a version memory located in the vehicle in which the map update can be stored separately from an existing map which is stored in another memory device;

at least one vehicle sensor, surroundings sensor and/or traffic telematics receiver located in the vehicle;

a map update provider configured to compare the map update received from a third party with an output of the at least one vehicle sensor, surroundings sensor and/or traffic telematics receiver and check the map update for plausibility;

wherein, when the map update is determined to be plausible based on the comparison, the vehicle system uses the map update for map matching a position of the vehicle; and wherein the existing map extract is overwritten with the updated map extract from the update module if the updated map extract has a higher degree of coincidence with an output of the at least one vehicle sensor, surroundings sensor and/or traffic telematics receiver.

2. A vehicle system according to claim 1, wherein the vehicle system releases the map for use which coincides more with the output of the at least one vehicle sensor, surroundings sensor and/or traffic telematics receiver.

3. A method for controlling a vehicle system located in a vehicle for map verification, comprising the steps of:

loading a map update received from a third party in an update module;

storing the map update in a version memory separately from an existing map which is stored in another memory device;

comparing the map update received from the third party with an output of at least one vehicle sensor, surroundings sensor and/or traffic telematics receiver and checking the map update for plausibility;

wherein, when the map update is determined to be plausible based on the comparison, the vehicle system uses the map update for map matching a position of the vehicle; and wherein the existing map extract is overwritten with the updated map extract from the update module if the updated map extract has a higher degree of coincidence with an output of the at least one vehicle sensor, surroundings sensor and/or traffic telematics receiver.

* * * * *